United States Patent [19]

Al-Rawi

[11] Patent Number: 4,815,125

[45] Date of Patent: Mar. 21, 1989

[54] TELEPHONE DIALING SYSTEM

[76] Inventor: Omar M. A. Al-Rawi, Ameria, Al-Firdous quarter No. 8/4/630, Baghdad, Iraq

[21] Appl. No.: 6,820

[22] Filed: Jan. 23, 1987

[30] Foreign Application Priority Data

Jan. 23, 1986 [IQ] Iraq .......................................... 19/86

[51] Int. Cl.⁴ ............................................ H04M 1/48
[52] U.S. Cl. ..................................... 379/357; 235/488; 235/489
[58] Field of Search ................. 379/357; 235/489, 488

[56] References Cited

U.S. PATENT DOCUMENTS

| | | | |
|---|---|---|---|
| 3,274,345 | 9/1966 | Ham, Jr. et al. | 379/357 |
| 3,493,730 | 2/1970 | Cilino et al. | 379/357 |
| 3,596,003 | 7/1971 | Poli | 379/357 |
| 3,809,826 | 5/1974 | Rhodes | 379/357 |
| 4,086,442 | 4/1978 | Rickard | 379/357 |

OTHER PUBLICATIONS

IBM Tech. Disclosure Bul., vol. 8, No. 1, 6/65, R. A Jensen & W. J. Levine, "Manufacturing Badge Cards", p. 161.

Primary Examiner—Robert Lev
Attorney, Agent, or Firm—Ladas & Parry

[57] ABSTRACT

A systen for dialing has a telephone a planar card having a planar handle portion at one end for use as a handle and in carrying identifying indicia and a contiguous, planar code portion at the other end with holes therethrough at locations identifying a sequence of codes to be dialed on a telephone. The location of the holes is at intersections of parallel columns and parallel rows transverse thereto, the columns corresponding to the sequence of the codes and the rows corresponding to all the codes which may be dialed on the telephone in any sequence of the codes. A card-reading device provides signals corresponding to the sequence of the codes to be dialed identified on the card on a signal-carrying line for each row on the card of the codes which may be dialed.

7 Claims, 4 Drawing Sheets

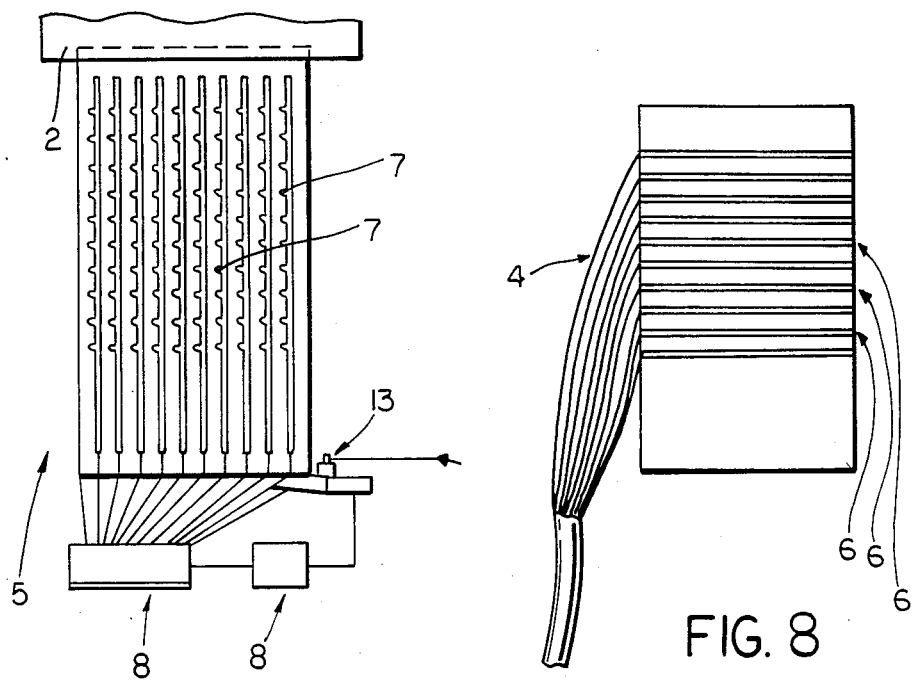
FIG. 7
FIG. 8
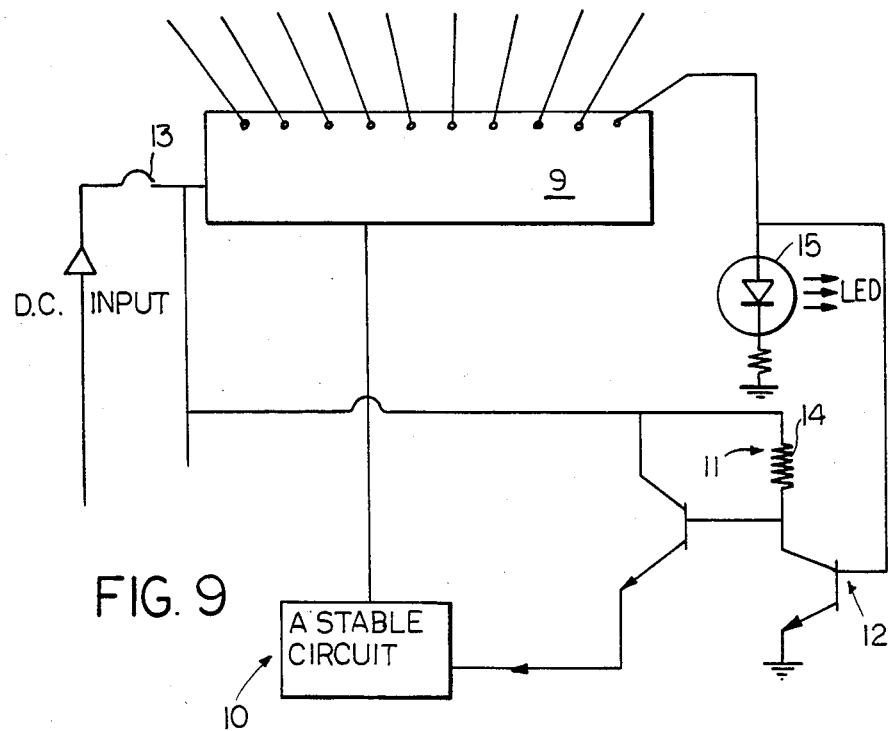
FIG. 9

TELEPHONE DIALING SYSTEM

The invention relates to a system for dialing a telephone and, more particularly, a system of a code-holed card, a punch for the holes in the card, a card reader responsive in the sequence of codes for dialing the telephone with a signal on a discrete line corresponding to the code to be dialed, and a book for storing the cards.

Dialing a telephone with a rotary dial has by this time given way to much-improved button dialing which is more amenable to computer-type signal processing and memory. Both types of dialing need, however, an educated and uncrippled (dextrous) person with good sight, and also need dialing time. Especially in an emergency, when the psychological condition of the dialer is not good, moreover, dialing a wrong number is common.

Accordingly, it is an object of the invention to simplify telephone dialing to overcome these problems.

To this and other ends, the invention provides a telephone system using a card. The card has a handle portion for handling and carrying indicia, such as a name or photograph or braille, for example, identifying the party at the telephone number dialed with the card in the system. (It is noted at the outset that a telephone is dialed with a sequence of codes which, often, is a number or mixed alpha/numerics or the like, tone or pulse represented, all hereinafter used interchangeably in the generic sense of a sequence of codes.) For dialing a telephone number with the card in the system, the card also has a code portion having holes therethrough at locations identifying the number to be dialed.

A preferred form of the card is reinforced for durability and use with two, contiguous, transparent, plastic sheets superposed on one side of the card. The line of contiguity of the sheet superposed on the handle portion of the card is not attached to the card and that sheet is otherwise peripherally attached to the card. It therefore forms a pocket for receiving and retaining the identifying indicia.

This is important because the dialer should also be able to make the card for the system in order to have newly-wanted telephone numbers available quickly and easily. For this, the system also preferably has a punch. The punch has punching members movable along columns of slots corresponding to the code or sequence of codes of the telephone number to be identified on the card with the hole locations and pushable into crossed, underlying rows of slots corresponding to the other of the code or sequence of codes. When a blank (un-holed) code portion of a card is interposed between the slots, and the punching members located along the columns of slots in the code or sequence for the rows of slots and pushed thereinto, the punching members punch the number-identifying holes into the code portion of the card.

The system also has a card reader for dialing the telephone according to the number identified by the holes through the code portion of the card. Preferably, the card reader is activated by inserting the code portion of the card into a slot. The code portion of the card is then between columns and rows of conductors and contacts arranged corresponding by to the columns and rows of the hole locations, and these come together at the holes. An electric signal is then given to the conductors in the sequence of the codes, for example, from a pulse-driven multiport ring counter and transferred to the contact touching the successive conductors to provide a signal on a contact-corresponding line discretely corresponding to the code in the sequence. These discrete lines are particularly advantageous with button-dialed telephones where they may be connected in parallel with the buttons to dial the telephone with the signals from the lines in the same way as with the signals from the buttons. With a rotary-dialed telephone, the lines enter a device for conversion to dialing pulse codes corresponding to those of the rotary dial.

The preferred system also has a storage book for the cards which displays the handle portion of the cards stored when opened for selecting and removing a card for use.

BRIEF DESCRIPTION OF THE DRAWINGS

Merely-preferred embodiments of the system of the invention not limiting the scope of the invention are shown in drawings, in which:

FIG. 7 is a front elevation of a portion of the system shown in FIG. 6, other portions of the system being broken away, the card portion of the system being moved, and other portions of the system being shown schematically;

FIG. 8 is a more-detailed circuit diagram of a portion of the system shown schematically in FIG. 7;

FIG. 9 is a rear elevation of another portion of the system shown in FIG. 7.

DESCRIPTION OF THE PREFERRED EMBODIMENTS

Figure 5:
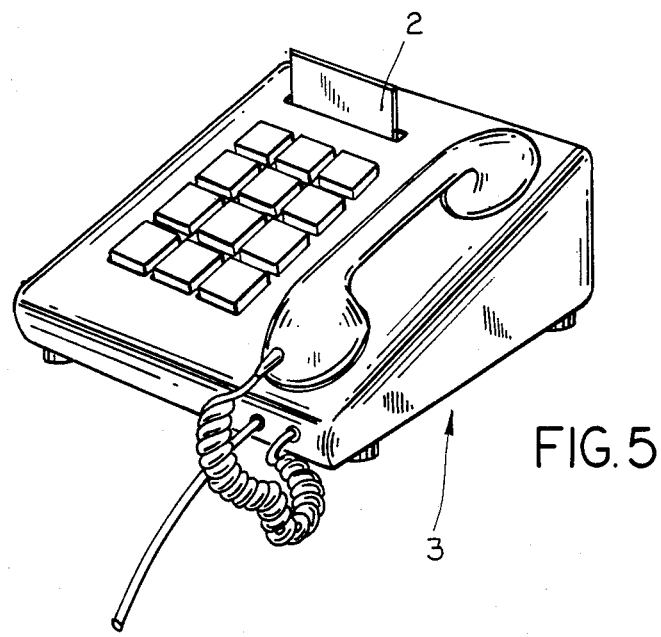
FIG. 5 is a perspective view of a telephone with one embodiment of the system.
Figure 6:
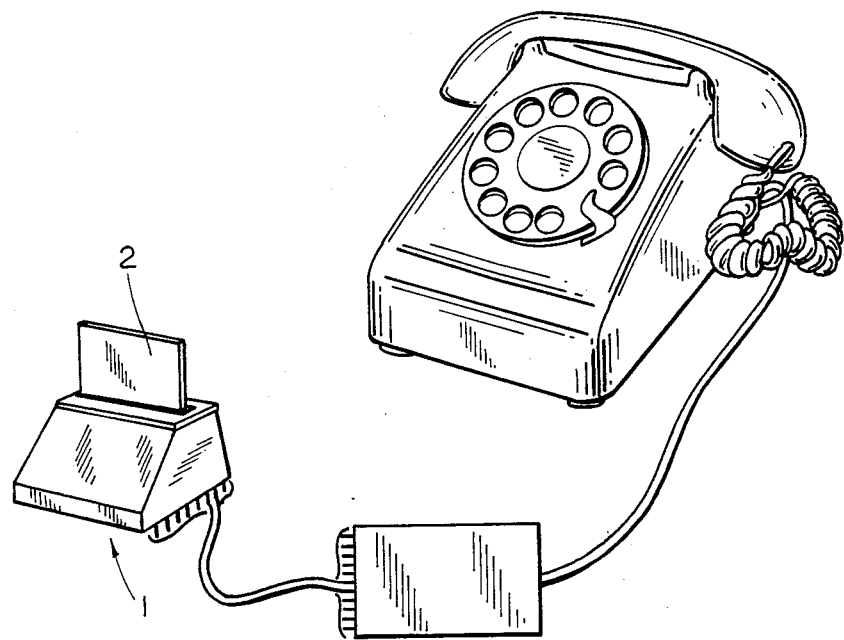
FIG. 6 is a perspective view of another telephone with another embodiment of the system.
Figure 10:
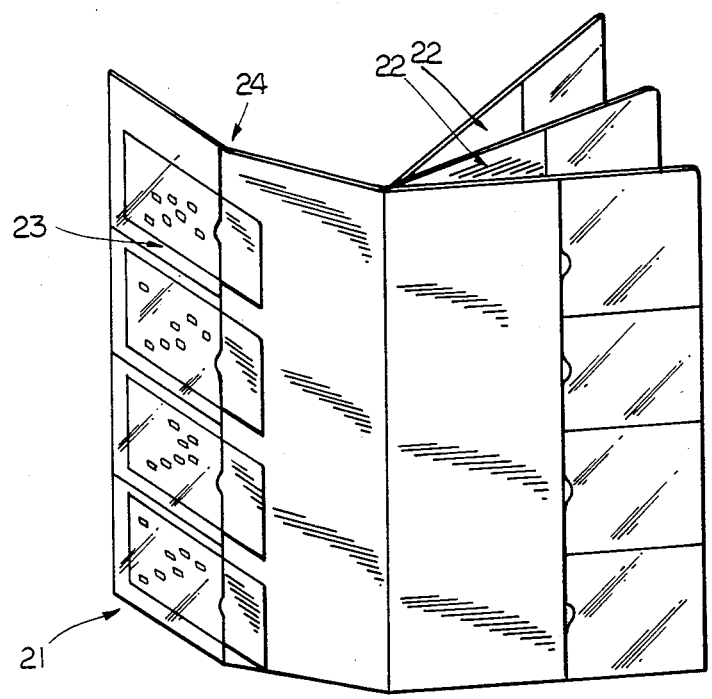
FIG. 10 is a perspective view of another, storage portion of the system.

The instrument can fit in a small box (at 1 in FIG. 6, for example) of a size related to the size of the cards used in the system. A very small card 1×2 cm or a big card, to the extent of ¼ post card, can be used. This box may be part of the newly produced telephone 3 in FIG. 5 or connected to the old one, inside it or outside, as in FIG. 6. In this box there are two sides of connectors 4, 5 in FIGS. 7, 9, the first horizontal and the second is vertical. The horizontal one 4 has ten lines 6, each line for connection to one of ten buttons in the telephone from 1, 2, 3 to 0 in FIG. 5 or to a dialer of the telephone in FIG. 6. The other side the vertical one 5, has small spring type conductors 7 in the level of each horizontal line to contact it in the crossing point. These vertical lines are connected to an electrical circuit 8 of a special arrangement shown in more detail in FIG. 8 to give pulses of current to these lines one after other from the first line to the 12th or more, and then stop and shut off as signaled with lighting of a small light emitting diode 15 to show that the dialing is finished in about 0.1 second for each line. This means, it needs about one second for 9 lines or codes as used in Iraq, for example.

The electrical circuit of FIG. 8 consists of counter of 9, 10, 11 or 16 output ports, an astable circuit 10 and two transistors 11, 12 connected as shown in the diagram. The current is entered through a small button switch 13 in the bottom of a card-receiving slot in the box, when pressed by the card. The current passes to the transistor 11 which has a base stimulated by a small current through a resistance 14. The astable circuit (A/C) 10 then starts to flash pulses, each 0.1 second, to stimulate the counter 9 to give impulses of current to the output ports and line 5 one by one. The last output port line goes to the light emitting diode 15 and to the base of the transistor 12 which is connected to the base of transistor 11 such that the current leaves the base of transistor 11 to the earth. This shuts off the current from the astable circuit, and the dialing. This will be repeated if the card is repressed again and stays pressed again until the dialing is finished (one second).

In each vertical line the current impulses will pass to the horizontal line of the level of the hole opening in the card to represent the number to be dialed. In example, telephone number 024661881. The 0 opening will be in the first line vertically and the 10th horizontally. The number 2 will be second vertical and second horizontal. The number 4 will be 3rd vertical and 4th horizontal, and so on.

Figure 1:
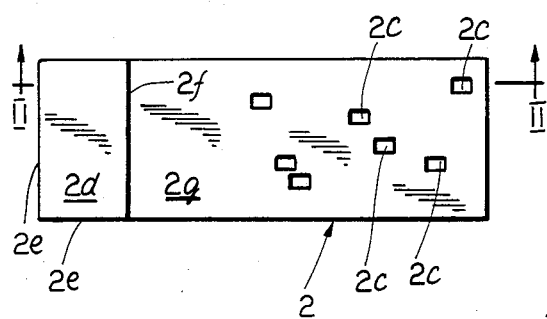
FIG. 1 is a plan view of a preferred card of the system.
Figure 2:
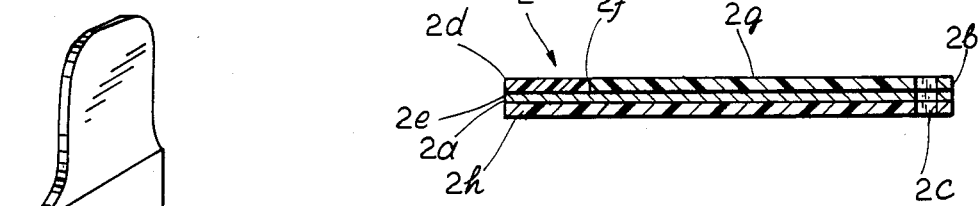
FIG. 2 is an edge elevation, in cross section, of the card of FIG. 1.
Figure 3:
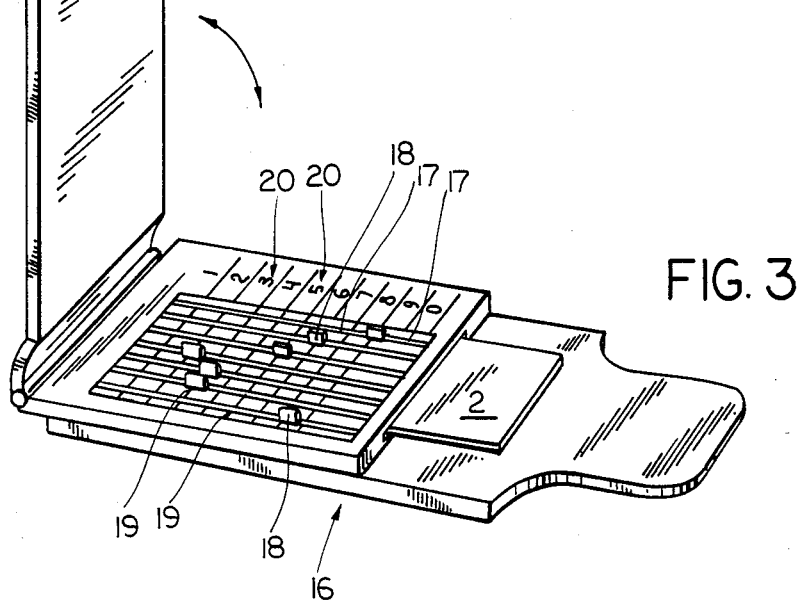
FIG. 3 is a perspective view of a preferred punch of the system for making a card of the system, together with the card.
Figure 4:
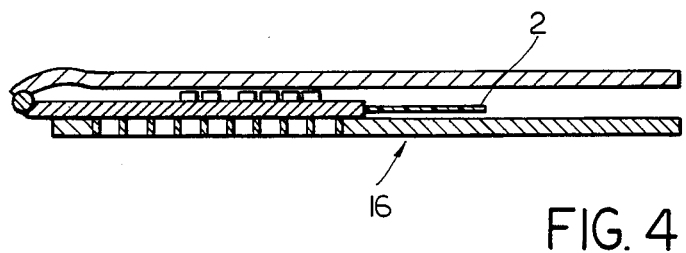
FIG. 4 is a side elevation, in cross section, of the punch of FIG. 3, together with the card.

The card 2, which is best shown in FIGS. 1 and 2, must be made from paperboard hardened by plastic to tolerate use. To transparently receive and protect the photograph of a person to be dialed by the uneducated, i.e. an indicia sheet (not shown), a handle portion 2a at one end of the card opposite a code portion 2b of the card for holes 2c for the telephone code to be dialed has a first transparent plastic sheet 2d attached thereto along a first portion 2e of its periphery, which is all but a second portion 2f of its periphery along the line of contiguity between the card portions. The first transparent plastic sheet thus forms a pocket for retaining the photograph or indicia sheet in superposition with the handle portion of the card after it is received between the first transparent plastic sheet and the handle portion of the card via the unattached second portion of the periphery of the transparent plastic sheet. A second transparent plastic sheet 2g can cover the code portion of the card on the same side of the card as the first transparent plastic sheet, and a third plastic sheet 2h can cover the other side of the card.

A punch 16 is a small instrument with roughly the same dimensions as the card of the system. It is a metallic plate with cut-in longitudinal slots 17 of the same longitudinal line system as the card. Punch buttons 18 move in the slots. Each button has a small metallic piece below for punching. Also on the metallic plate are horizontal lines 19 resembling the horizontal lines of the card of the system. On the surface there is a small dimple at each horizontal line to allow the buttons to stop in the proper place. At the end of each horizontal line numbers 20 from 1 to 9 and 0 is written. There is another plate-under this plate with openings under each crossing. These two plates arranged in a special way as seen in the drawings for punching of the cards.

A storage book 21 has plastic pages 22. Each page is divided into small pockets 23 the same size of the card. Each page can be bent longitudinally at 24 in the level of the end of the pocket 23 to allow easy removal of the card.

To prepare a number for dialing, we firstly arrange the number on the punch. Then we punch the card as seen in the drawings. We put the name in the handle end of the card, or we put the photograph of the person or a sign like a crescent for a Hospital and another signal for the Police for the uneducated, or we write in Braille for the blind, and so on. We bring the prepared card and put it in the place. Then we press it, after removing handset of the telephone, for about 1 second or until the light goes on. Then dialing finished. If we want to repeat the dialing, we just hang up the telephone then repeat, pressing on the card again.

The benefits of the system

1. Easy and correct dialing for the blind and handicapped.
2. Rapid and easy dialing for the uneducated and for the people with poor sight.
3. Easy and rapid dialing for all people, especially when we are in hurry and a wrong number may be dialed. By this rapid method no mistake can happen.
4. For secrecy of the number.
5. In the car.

I claim:

1. A system for dialing a telephone, comprising:
a planar card having a planar handle portion at one end for use as a handle and in carrying identifying indicia and a contiguous, planar code portion at the other end with holes therethrough at locations identifying a sequence of codes to be dialed on a telephone, the location of the holes being at intersections of parallel columns and parallel rows transverse thereto, the columns corresponding to the sequence of the codes and the rows corresponding to all the codes which may be dialed on the telephone in any sequence of the codes;
card-reading means for providing signals corresponding to the sequence of the codes to be dialed identified on the card, the card-reading means having a signal-carrying line for each row on the card of the codes which may be dialed in any sequence of the codes, first card-receiving means for receiving the code portion of the card, cooperative means cooperative between the received code portion of the card and the signal-carrying lines for providing a signal on each line corresponding to a code identified on the card, and sequencing means for providing the signals from the cooperative means on the single carrying lines in the sequence identified on the card;
dialing means for dialing the telephone in response to the signals on the signal carrying lines; and,
for an indicia sheet having opposite, planar sides with the identifying indicia on one of the sides when the other side is superposed on the handle portion of the card, a first transparent plastic sheet for superposition on the indicia sheet attached to the handle portion of the card along only a portion of the periphery of the first transparent sheet for forming a pocket between the first transparent plastic sheet and the card for receiving and retaining the indicia sheet on the card.

2. The system of claim 1 wherein a portion of the periphery of the first transparent plastic sheet is along the line of contiguity between the handle and code portions of the card and not attached to the handle portion of the card.

3. The system of claim 2, wherein the card further comprises a second transparent plastic sheet superposed over all of the code portion of the card, attached thereto, and having holes therethrough corresponding to the holes through the card.

4. The system of claim 2, wherein the cooperative means of the card-reading means comprises conductors located at intersections of parallel columns and parallel rows transverse thereto corresponding to the intersections of the columns and rows of the code portion of the card, the first card-receiving means has means for receiving the code portion of the card with the columns and rows of the card in superposed correspondence with the columns and rows of the conductors, and contacts in rows corresponding to the rows of the conductors at the intersections of the columns, all the conductors in each column being electrically connected to each other and to the sequencing means and all the contacts in each row being electrically connected to each other and to respective ones of the signal-carrying lines, each conductor and contact having means for contacting each other if a hole in the card is at the intersection of the columns and rows thereof when the code portion of the card is received in the first card receiving means and being electrically separated if a hole is not at the intersection.

5. The system of claim 4, wherein the code portion of the card electrically separates the contacts and conductors when no hole is at the intersection, the card being electrically non-conductive.

6. The system of claim 4 wherein the sequencing means comprises switch means for providing an electric signal in response to receipt of the code portion of the card in the first card-receiving means, an electric pulse-producing circuit, a counter having outport ports for sequentially providing an electric signal in response to the pulses of the pulse producing circuit when enabled with the electric signal of the switch means, the output ports being electrically connected, respectively, to the columns of the conducts and means responsive a complete sequence of the out ports of the counter for dialing the counter.

7. In a system for dialing a telephone having a planar card with a handle portion at one end for use as a handle and for carrying identifying indicia and a contiguous code portion at the opposite end for holes therethrough at locations identifying a sequence of codes to be dialed on the telephone, card-reading means for providing signals corresponding to the sequence of codes identified by the locations of the holes through the card, and dialing means for dialing the telephone in response to the signals, the improved card, comprising:

a first transparent plastic sheet attached to the handle portion of the card along only a first portion of the periphery of the first transparent plastic sheet for forming a pocket between the first transparent plastic sheet and the card, whereby to retain an indicia sheet in the pocket therebetween, and not attached to the card along a second portion of the periphery of the first transparent plastic sheet for receiving the indicia sheet into the pocket between the card and the second portion of the periphery, whereby to superpose the indicia sheet on the handle portion of the card.

* * * * *